US011927315B2

(12) United States Patent
Bretschneider et al.

(10) Patent No.: US 11,927,315 B2
(45) Date of Patent: Mar. 12, 2024

(54) LIGHTING DEVICE AND RELATED METHODS

(71) Applicant: Velaflame, LLC, Saratoga Springs, UT (US)

(72) Inventors: Ken Bretschneider, Saratoga Springs, UT (US); Patrice Bretschneider, Saratoga Springs, UT (US); Kyler Tolman, Ann Arbor, MI (US); Ian Jensen, Provo, UT (US); Valerie Fisher, Orem, UT (US); JuHang Kim, Provo, UT (US); Nathan Jensen, Santa Ana, CA (US)

(73) Assignee: Velaflame, LLC, Saratoga Springs, UT (US)

( * ) Notice: Subject to any disclaimer, the term of this patent is extended or adjusted under 35 U.S.C. 154(b) by 0 days.

(21) Appl. No.: 18/192,541

(22) Filed: Mar. 29, 2023

(65) Prior Publication Data

US 2023/0313958 A1 Oct. 5, 2023

Related U.S. Application Data

(60) Provisional application No. 63/325,029, filed on Mar. 29, 2022.

(51) Int. Cl.

| | |
|---|---|
| ***F21S 10/04*** | (2006.01) |
| ***F21V 23/02*** | (2006.01) |
| *F21Y 115/10* | (2016.01) |

(52) U.S. Cl.
CPC .......... *F21S 10/046* (2013.01); *F21V 23/023* (2013.01); *F21V 2200/10* (2015.01); *F21Y 2115/10* (2016.08)

(58) Field of Classification Search
CPC . F21Y 2115/10; F21S 10/046; F21V 2200/10; F21V 23/023
See application file for complete search history.

(56) References Cited

U.S. PATENT DOCUMENTS 10,488,005 B2 * 11/2019 Roberts ................ G02B 6/0006

OTHER PUBLICATIONS

Innovation Q+ NPL Search (Year: 2023).*

* cited by examiner

*Primary Examiner* — Anabel Ton
(74) *Attorney, Agent, or Firm* — PCFB, LLC; Jared L. Cherry

(57) ABSTRACT

The present disclosure relates to a lighting device configured to mimic the appearance of a flame. In one embodiment, the lighting device includes a power subsystem configured to receive an alternating current input and to generate a direct current output. The lighting device also includes a reflector to reflect light generated by a lighting subsystem. A movement subsystem may move the reflector to mimic the appearance of a flame. A communication subsystem may receive at least one parameter associated with at least one of the lighting subsystem and the movement subsystem. A control subsystem may implement the at least one parameter.

18 Claims, 10 Drawing Sheets

LIGHTING DEVICE AND RELATED METHODS

RELATED APPLICATION

This application claims priority to U.S. Provisional Patent Application No. 63/325,029, filed on Mar. 29, 2023, titled "LIGHTING DEVICE AND RELATED METHODS," which is incorporated herein in its entirety by this reference.

TECHNICAL FIELD

The present disclosure relates to a lighting device and related methods. More particularly but not exclusively, the invention relates to a lighting device that mimics the appearance of a flame.

BRIEF DESCRIPTION OF THE DRAWINGS

Some embodiments of the present invention are illustrated as examples and are not limited by figures of the following drawings, in which like references may indicate similar elements and in which.

DETAILED DESCRIPTION

Figure 1A:
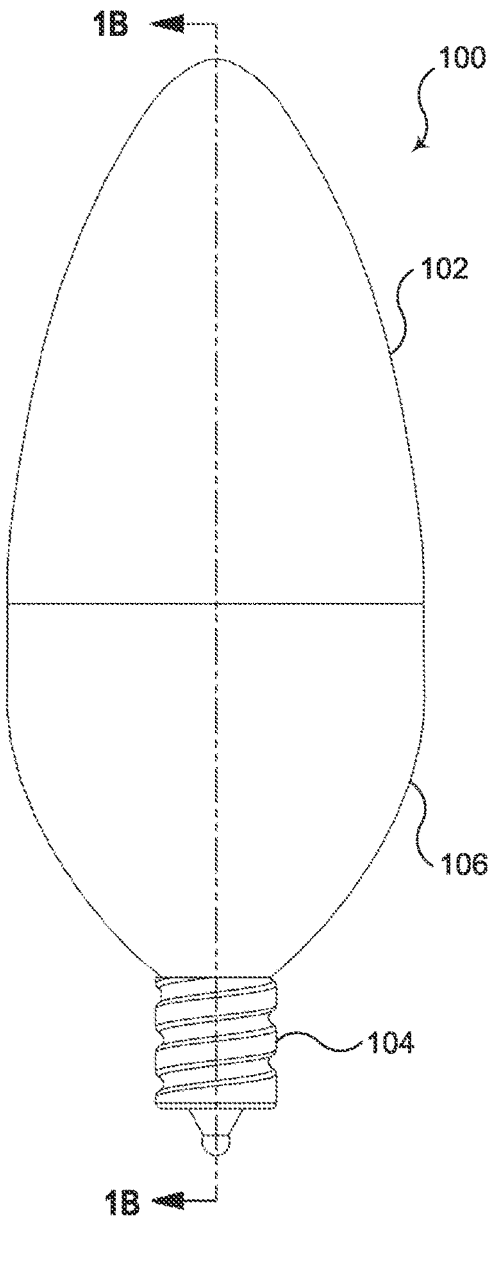
FIG. 1A depicts a front view of a lighting device consistent with embodiments of the present disclosure.

The present application discloses various embodiments of lighting devices that mimic the appearance of a flame. In various embodiments, light may be generated in a color that mimics a flame and a moving reflector may simulate movement characteristics of a flame. Lighting devices consistent with the present disclosure may be used in a variety of applications (e.g., indoor and outdoor light fixtures, permanent or temporary applications) and in a variety of form factors (e.g., light bulbs, night lights, lighting fixtures, flashlights, accent lights, decorative lights, strand lights, etc.).

Various lighting devices consistent with the present disclosure may include a lighting element, a control system, a casing, and a power system. The lighting element may direct light toward a reflector. In various embodiments, a plurality of Red-Green-Blue-White (RGBW) light emitting diodes (LEDs) may generate the light directed by the lighting elements. A control system may establish parameters of the system (e.g., on/off status, light color, brightness, movement of the reflector, etc.). A power supply may receive power from an external source and condition the power for use by the lighting device.

In some embodiments, various parameters of a lighting device consistent with the present disclosure may be controlled using a mobile application. Such parameters may include light color, light patterns, and/or movement of the reflector. The lighting device may include an interface to communicate with the application. Such an interface may support communication using Bluetooth (IEEE 802.15), including Bluetooth Low Energy and Bluetooth mesh, and/or Wi-Fi (IEEE 801.11).

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

A number of techniques and steps are disclosed in connection with various embodiments. Each of these has individual benefits and each can also be used in conjunction with one or more, or in some cases all, of the other disclosed techniques. Accordingly, for the sake of clarity, this description does not repeat every possible combination of the individual steps. Nevertheless, the specification and claims should be read with the understanding that such combinations are within the scope of the invention and the claim.

The present disclosure is to be considered as an exemplification of specific embodiments, and is not intended to limit the claims as understood by one of skill in the art.

FIG. 1A depicts a front view of a lighting device 100 consistent with embodiments of the present disclosure. Lighting device 100 includes a bulb cover 102. A base 104 may be used to couple lighting device 100 to a receptacle (not shown). In the illustrated embodiment, base 104 is configured to couple to an E12 bulb base (a/k/a a candelabra base). Electricity may be drawn from the receptacle to power lighting device 100. In one embodiment, a power supply subsystem may be configured to convert 120V AC power to 5V DC, which can be used by lighting device 100. The electrical components that make up the power supply may be integrated into a printed circuit board (PCB) that also includes other electrical components.

Bulb cover 102 may be formed of a transparent or translucent material that allows light to escape lighting device 100 while providing protection for the elements disposed within bulb cover 102. Bottom casing 106 may similarly house various elements, such as electrical and optical components, of lighting device 100.

Figure 1B:
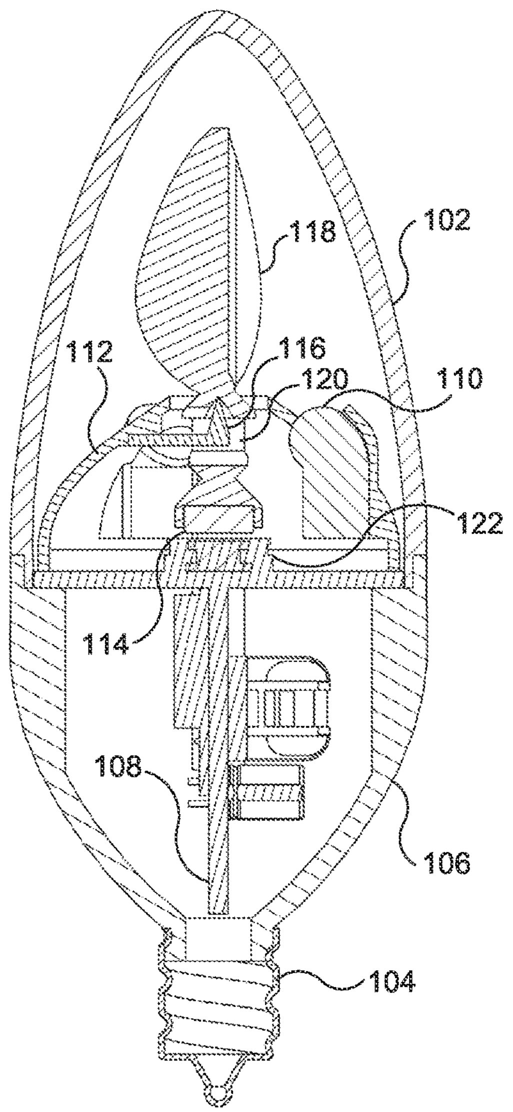
FIG. 1B depicts a cross section view of the lighting device of FIG. 1A taken along line 1B-1B consistent with embodiments of the present disclosure.

FIG. 1B depicts a cross-section view of the lighting device 100 of FIG. 1A taken along line 1B-1B consistent with embodiments of the present disclosure. A PCB assembly 108 is disposed within bottom casing 106. Among other things, PCB assembly 108 may include a power subsystem to receive power from an external source coupled to base 104 and to condition the power for use by lighting device 100. In some embodiments, base 104 may receive alternating current (AC) electrical energy and PCB assembly 108 may include an AC-to-direct-current (DC) conversion subsystem.

PCB assembly 108 may include various electrical components operable to convert AC to DC power. Additional elements disposed on PCB assembly 108 may include a communication subsystem configured to enable lighting device 100 to be controlled by an external device (not shown), such as an application operating on a mobile computing device.

In some embodiments, various parameters of a lighting device consistent with the present disclosure may be controlled using a mobile application. Such parameters may include light color, light patterns, and/or movement of the reflector. The lighting device may include an interface to communicate with the application. Such an interface may support communication using Bluetooth (IEEE 802.15) or Wi-Fi (IEEE 801.11).

A plurality of light pipes 110 may conduct light from a plurality of light sources toward a reflector 118. In various embodiments, light pipes 110 may be embodied as an optical fiber or a solid transparent plastic rod for transmitting light. Light pipes 110 may direct light toward reflector 118, which may move to simulate the motion of a flame.

Element holder 112 may engage with various elements (e.g., light pipes 110, reflector pin 116, and reflector 118). Element holder 112 may hold each of the elements in a specific arrangement. Reflector pin 116 may be coupled to element holder 112 and may be used to suspend reflector 118. Recess 120 may be configured to receive reflector pin 116. A connection between reflector pin 116 and reflector 118 may allow reflector 118 to pivot, and such motion may simulate the motion of a flame.

Reflector 118 may include a magnet 114 that may be used to move reflector 118. PCB assembly 108 may include a magnetic element 122 to interact with magnet 114 and to cause reflector 118 to move. Magnetic element 122 may comprise an electromagnet that can be selectively activated to generate an attractive or repulsive force. Controlled cycling of magnetic element 122 may result in a desired motion of reflector 118.

In the illustrated embodiment, reflector 118 comprises three sides offset by 120 degrees. The motion of reflector 118 may create a different pattern for each of the plurality of light pipes 110. In other embodiments, reflector 118 may comprise a different number of sides (e.g., 4 sides, 5 sides, etc.).

Figure 1C:
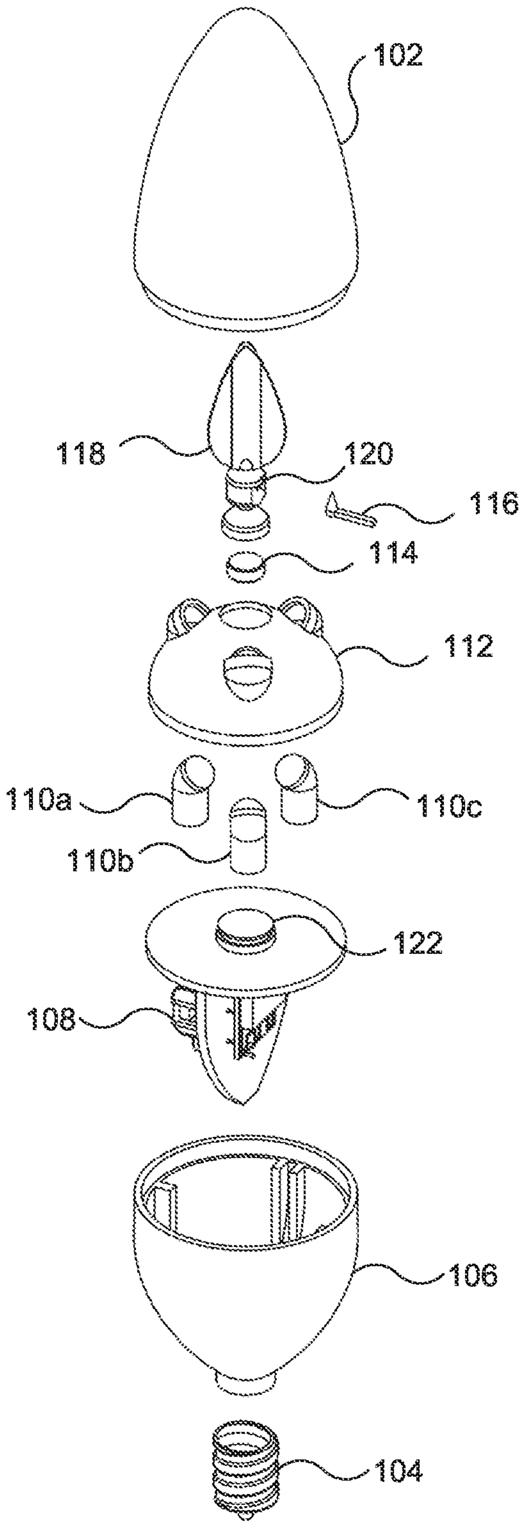
FIG. 1C depicts an exploded view of the lighting device of FIG. 1A consistent with embodiments of the present disclosure.

FIG. 1C depicts an exploded view of the lighting device of FIG. 1A consistent with embodiments of the present disclosure. As illustrated, bottom casing 106 may couple to base 104, and PCB assembly 108 may be received within bottom casing 106. Three light pipes 110*a*, 110*b*, and 110*c* may direct light from PCB assembly 108 onto reflector 118.

Element holder 112 may receive light pipes 110*a*-110*c*. Element holder 112 may also receive reflector pin 116 and reflector 118. Reflector 118 may include recess 120 to receive reflector pin 116. Recess 120 may include sufficient area to permit reflector 118 to move. Reflector 118 may receive magnet 114. Magnet 114 may be disposed above magnetic element 122. Bulb cover 102 and bottom casing 106 may create a shell around the other elements.

Figure 2B:
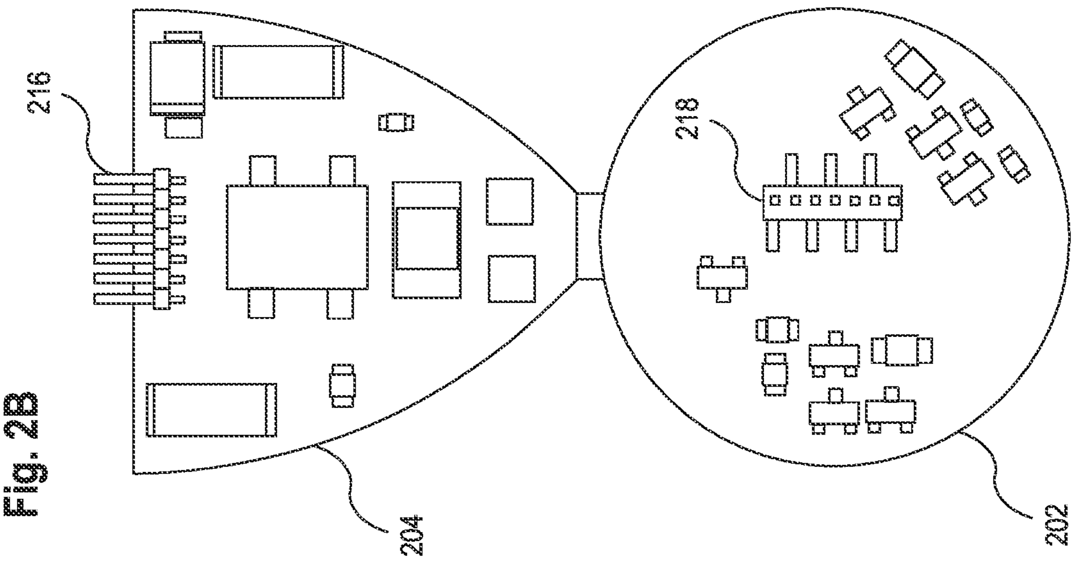
FIG. 2B depicts a second side of the printed circuit board shown in FIG. 2A consistent with embodiments of the present disclosure.
Figure 2A:
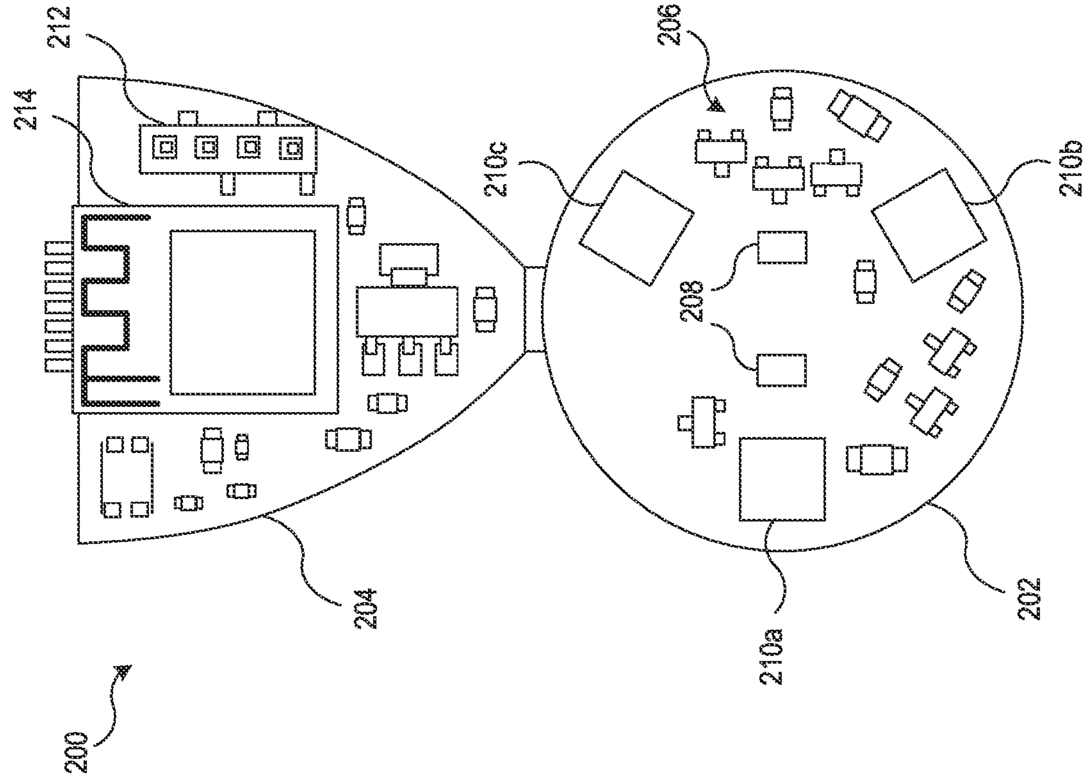
FIG. 2A depicts a first side of a printed circuit board consistent with embodiments of the present disclosure.

FIG. 2A depicts a first portion of a printed circuit board 200 consistent with embodiments of the present disclosure. Printed circuit board 200 may include a first portion 202 and a second portion 204. First portion 202 may be configured to be received horizontally within a bulb base, such as bottom casing 106 illustrated in FIG. 1C. Second portion 204 may be configured to be received vertically within a bulb base, such as bottom casing 106 illustrated in FIG. 1C. First portion 202 and second portion 204 may be separated after fabrication for use in a lighting device consistent with embodiments of the present disclosure.

First portion 202 may include a plurality of LEDs 210*a*, 210*b*, and 210*c*. LEDs 210*a*-210*c* may be a part of a lighting subsystem configured to generate a light output and direct the light output to a reflector, such as reflector 118 illustrated in FIG. 1. LEDs 210*a*-210*c* may be configurable to emit light of a desired color and brightness. LEDs 210*a*-210*c* may increase and decrease in brightness and may change color to mimic the appearance of a flame. The color, brightness, and speed of change may be changeable by a user in various embodiments.

A plurality of magnetic elements 208 may be disposed around the center of first portion 202 and may interact with a magnet in a reflector. Changing the magnetic field of magnetic elements 208 may induce motion in the reflector. A plurality of other components 206 (e.g., resistors, capacitors, transistors etc.) may also be disposed on printed circuit board 200. Such components may generate direct current from an alternating current and perform other functions.

Second portion 204 may include a wireless communication chip 214. Wireless communication chip 214 may enable communication via WiFi, Bluetooth, or other wireless communication protocols. Wireless communication chip 214 may allow a user to control various aspects of the lighting device including printed circuit board 200, such as the color and/or brightness of a light source, and/or motion of a reflector. In various embodiments, a user may be able to control power, light intensity, motion, and color through an application in communication with wireless communication chip 214. A connector 212 may be configured to couple to an alternating current power source.

FIG. 2B depicts a second side of the printed circuit board 200 shown in FIG. 2A consistent with embodiments of the present disclosure. Connector pins 216 may extend from second portion 204. Connector pins 216 may couple to a receptacle 218 after second portion 204 and first portion 202 are separated. Connector pins 216 and receptacle 218 may permit the transmission of electrical signals and power between first portion 202 and second portion 204.

Figure 3A:
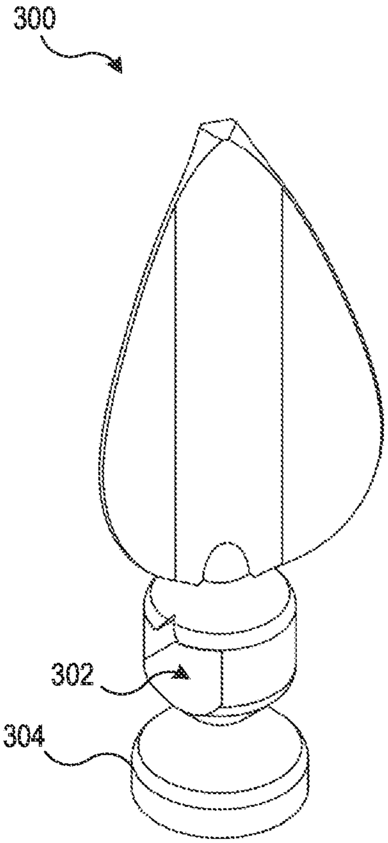
FIG. 3A illustrates an isometric view of a reflector consistent with embodiments of the present disclosure.

FIG. 3A illustrates an isometric view of a reflector 300 consistent with embodiments of the present disclosure. Reflector 300 includes a base 304. In some embodiments, a magnet may be housed within base 304. The magnet may be used to cause reflector 300 to move by creating changing magnetic fields that interact with the magnet. A recess 302 may be disposed in the middle of reflector 300. Recess 302 may receive a pin, such as reflector pin 116 illustrated in FIG. 1C, on which reflector 300 rests. The reflector pin may allow reflector 300 to move in a manner that mimics the motion of a flame.

Figure 3B:
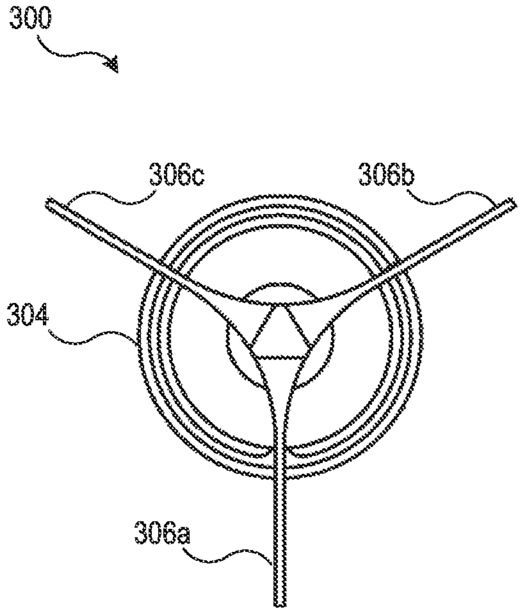
FIG. 3B illustrates a top view of the reflector illustrated in FIG. 3A consistent with embodiments of the present disclosure.

FIG. 3B illustrates a top view of the reflector 300 illustrated in FIG. 3A consistent with embodiments of the present disclosure. Reflector 300 has three surfaces 306*a*, 306*b*, and 306*c*. In some embodiments, a different light source may be used to illuminate each of the three surfaces 306*a*, 306*b*, and 306*c*. Such an embodiment is illustrated in FIG. 1C. Other embodiments may include different numbers of light sources and/or reflectors.

Figure 4A:
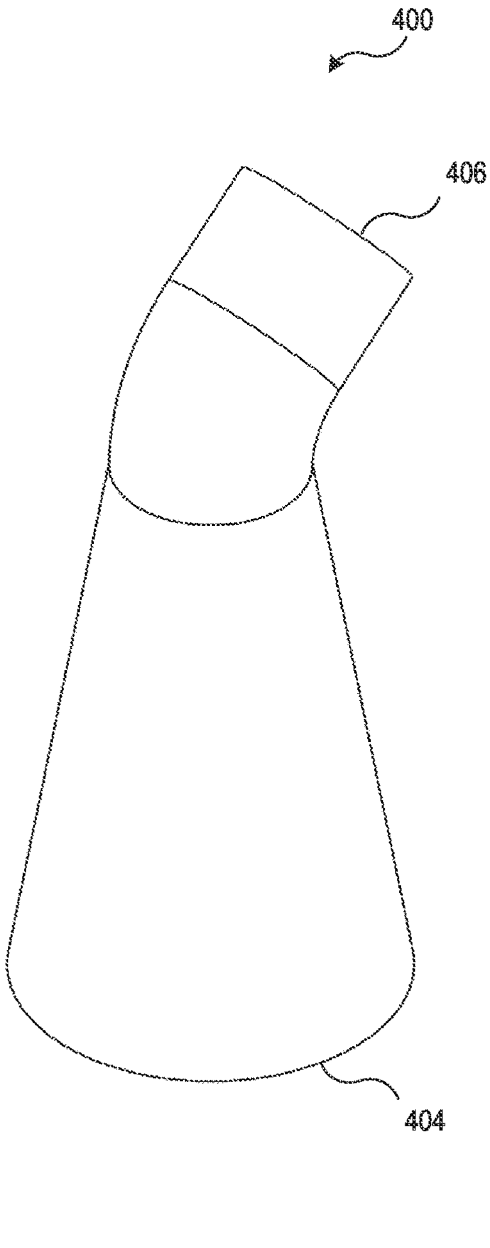
FIG. 4A illustrates an isometric view of a light pipe to focus and redirect light consistent with embodiments of the present disclosure.

FIG. 4A illustrates an isometric view of a light pipe 400 to focus and redirect light consistent with embodiments of the present disclosure. Light pipe 400 decreases in cross-sectional area along its length (i.e., from an input face 404 to an output face 406). The change in cross-sectional area may collect and focus more light in comparison to a light pipe that has a consistent or approximately consistent cross-sectional area along its length. Light pipe 400 may collect and focus light on a reflector to mimic the appearance of a flame. In some embodiments, the input face 404 and/or the output face 406 may be curved (e.g., a convex or concave shape) to focus the light emitted from the light pipe 400.

Figure 4B:
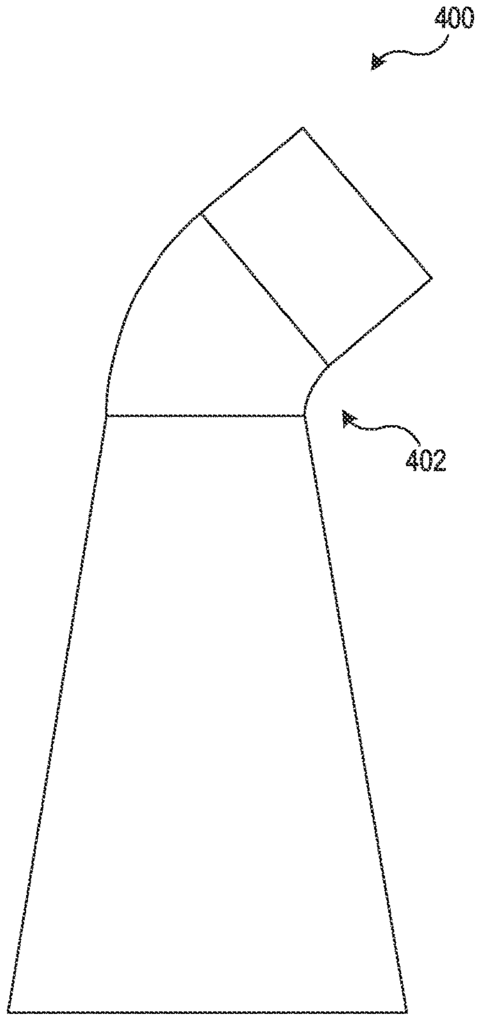
FIG. 4B illustrates a side view of the light pipe of FIG. 4A and consistent with embodiments of the present disclosure.

FIG. 4B illustrates a side view of the light pipe 400 of FIG. 4A consistent with embodiments of the present disclosure. Light pipe 400 includes a bend 402 to redirect light toward a reflector. In one embodiment, the bend 402 may be approximately 130°. In some embodiments, a reflective coating may be used along the length of light pipe 400 to minimize light loss. Reducing light loss may increase the perceived brightness of the lighting device consistent with the present disclosure.

Figure 5:
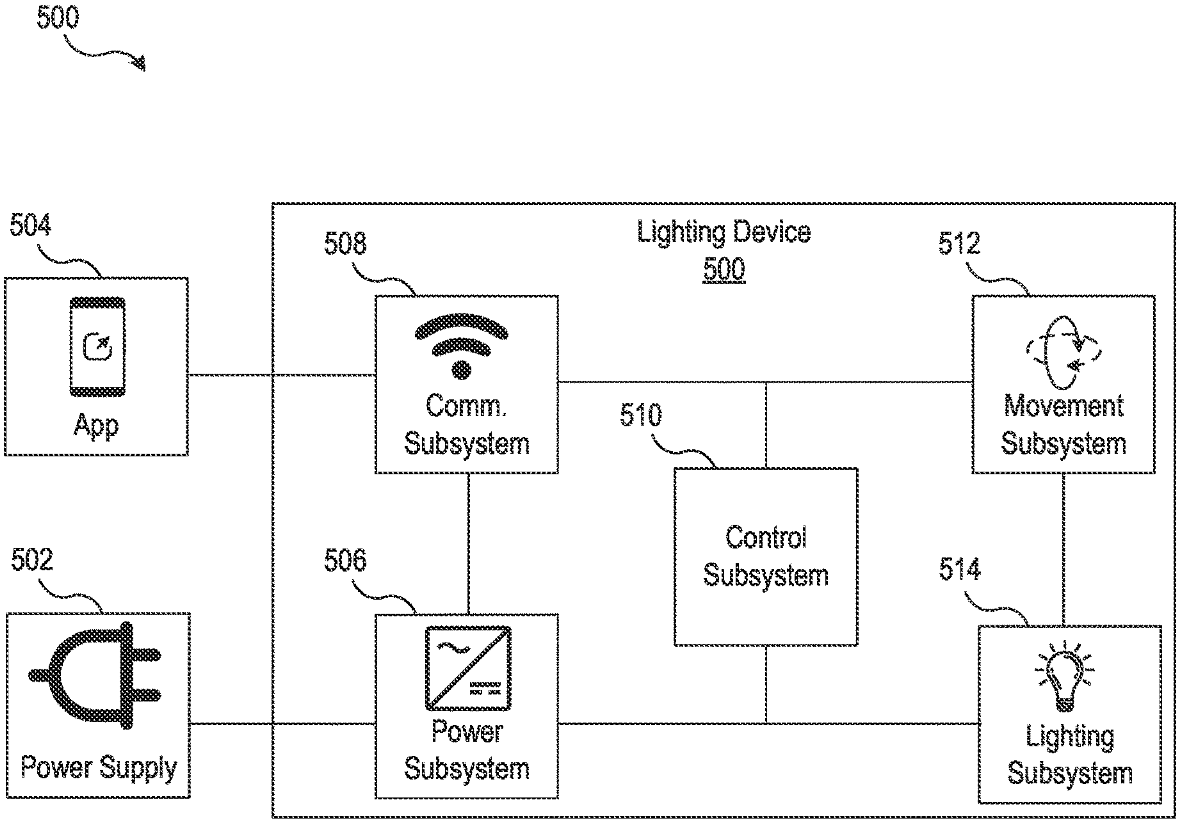
FIG. 5 illustrates a functional block diagram of a plurality of subsystems within a lighting device consistent with embodiments of the present disclosure.

FIG. 5 illustrates a functional block diagram of a plurality of subsystems within a lighting device 500 consistent with embodiments of the present disclosure. Lighting device 500 may receive alternating electrical current from a power supply 502. A power subsystem 506 may convert the alternating current to direct current suitable for use by a communication subsystem 508, a control subsystem 510, a movement subsystem 512, and a lighting subsystem 514. In one specific embodiment, power subsystem 506 may receive 120-volt, 60 Hertz alternating current and output 5-volt direct current.

Communication subsystem 508 may communicate with an application 504. Although a mobile application is specifically illustrated, communication subsystem 508 may receive communication from a variety of types of devices and using a variety of communication technologies and protocols. Application 504 may allow a user to control various parameters of lighting device 500 (e.g., color, brightness, movement, etc.).

Control subsystem 510 may control various aspects of lighting device 500. In some embodiments, control subsystem 510 may generate electrical signals that result in a desired action, while in other embodiments, control subsystem 510 may issue commands or instructions to other subsystems. Control subsystem 510 may include a processing element and computer-readable media (both transitory and non-transitory) to implement such functionality.

Lighting subsystem 514 may generate and direct light. In one specific embodiment, lighting subsystem 514 may include a plurality of LEDs to generate light, a plurality of light pipes to direct the light, and a reflector to reflect the light. Lighting subsystem 514 may generate different colors and brightness and may implement other functions to mimic the appearance of a flame.

Movement subsystem 512 may generate movement to mimic the motion of a flame. In one embodiment, a three-sided reflector may be coupled to a magnet, and the magnet may interact with a variable electromagnetic field generated by an electromagnet. Selectively activating the electromagnet may induce motion to mimic the appearance of a flame.

Figure 6B:
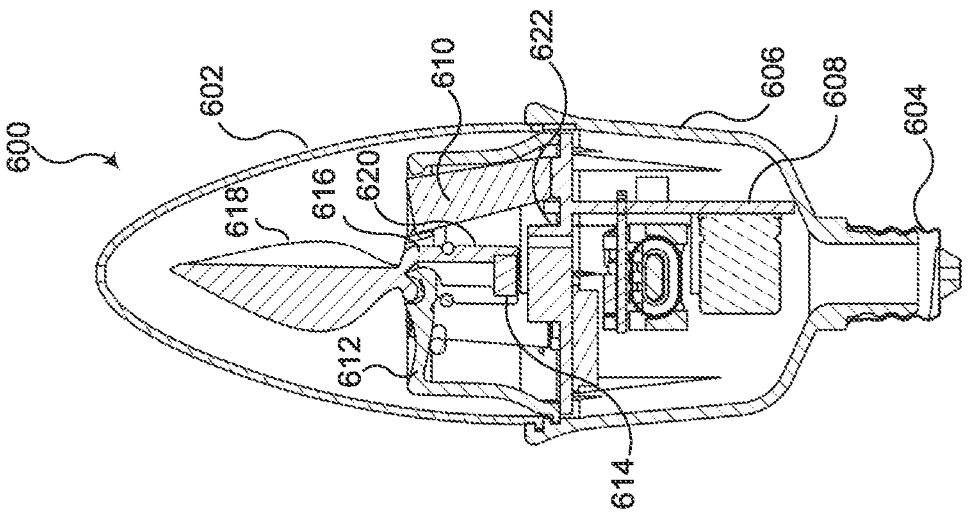
FIG. 6B depicts a side section view of the lighting device of FIG. 6A taken along line B-B consistent with embodiments of the present disclosure.
Figure 6A:
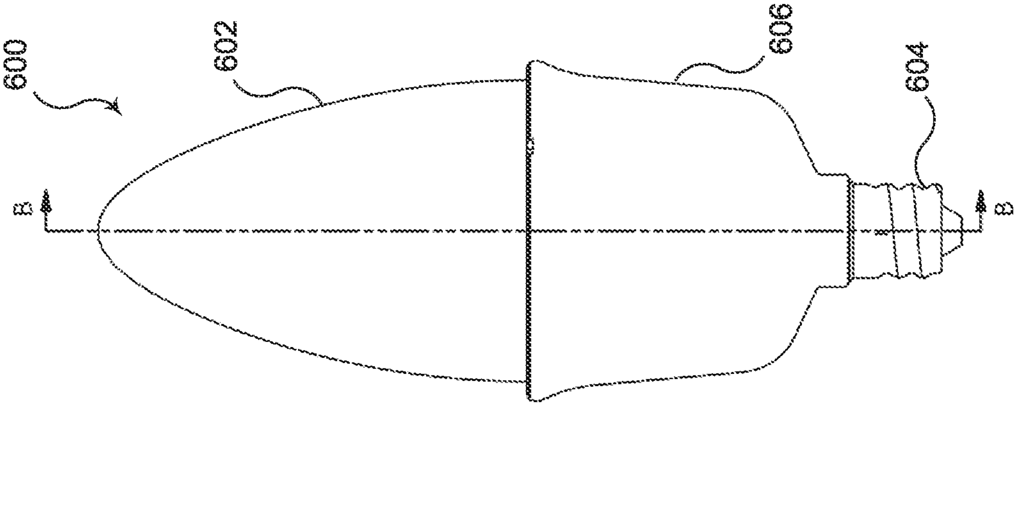
FIG. 6A depicts a front view of a lighting device consistent with embodiments of the present disclosure.

FIG. 6A depicts a front view of a lighting device 600 consistent with embodiments of the present disclosure. Lighting device 600 may include a protective cover 602. A bulb base 604 may be used to couple lighting device 600 to a receptacle (not shown). Electricity may be drawn from the receptable to power lighting device 600. In one embodiment, a power supply subsystem may be configured to convert commonly utilized power sources (e.g., 120V or 240V AC power) to 5V DC, which can be used to power lighting device 600. The electrical components that make up the power supply may be integrated into a PCB that also includes other electrical components.

Protective cover 602 may be formed of a transparent or translucent material that allows light to escape lighting device 600 while providing protection for the elements disposed within protective cover 602. Bottom casing 606 may house various elements, such as electrical and optical components of lighting device 600.

FIG. 6B depicts a side section view of the lighting device 600 of FIG. 6A taken along line B-B consistent with embodiments of the present disclosure. A PCB assembly 608 may be disposed within bottom casing 606. Among other things, PCB assembly 608 may include a power subsystem to receive power from an external source coupled to bulb base 604 and condition the power for use by lighting device 600. In some embodiments, bulb base 604 may receive AC electrical energy and PCB assembly 608 may include an AC-to-DC conversion subsystem.

PCB assembly 608 may include various electrical components operable to convert AC to DC power. Additional elements disposed on PCB assembly 608 may include a communication subsystem configured to enable lighting device 600 to be controlled by an external device (not shown), such as an application operating on a mobile computing device.

In some embodiments, various parameters of a lighting device consistent with the present disclosure may be controlled using a mobile application. Such parameters may include light color, light patterns, and/or movement of the reflector. The lighting device may include an interface to communicate with the application. Such an interface may support communication using Bluetooth (IEEE 802.15) or Wi-Fi (IEEE 801.11).

A plurality of light pipes 610 may conduct light from a plurality of light sources toward a reflector 618. In some embodiments, light pipes 610 may be embodied as an optical fiber or a solid transparent plastic rod for transmitting light. Light pipes 610 may direct light toward reflector 618, which may move to simulate the motion of a flame.

Top casing 612 may engage with various elements (e.g., light pipes 610, reflector pin 616, and reflector 618). Top casing 612 may hold each of the elements in a specific arrangement. Reflector pin 616 may be attached to top casing 612 and may be used to suspend reflector 618. Hinge joint 620 may be configured to receive reflector pin 616. A connection between reflector pin 616 and reflector 618 may allow reflector 618 to move, and such motion may simulate the motion of a flame.

Reflector 618 may include a magnet 614 that may be used to move reflector 618. PCB assembly 608 may include an electromagnet 622 to interact with magnet 614 and to cause reflector 618 to move. Electromagnet 622 may be designed to be selectively activated to generate an attractive or repulsive force. Controlled cycling of electromagnet 622 may result in a desired motion of reflector 618.

In the illustrated embodiment, reflector 618 comprises three sides offset by 120 degrees. The motion of reflector 618 may create a different pattern for each of the plurality of light pipes 610. In other embodiments, reflector 618 may comprise a different number of sides (e.g., 4 sides, 5 sides, etc.).

Figure 6C:
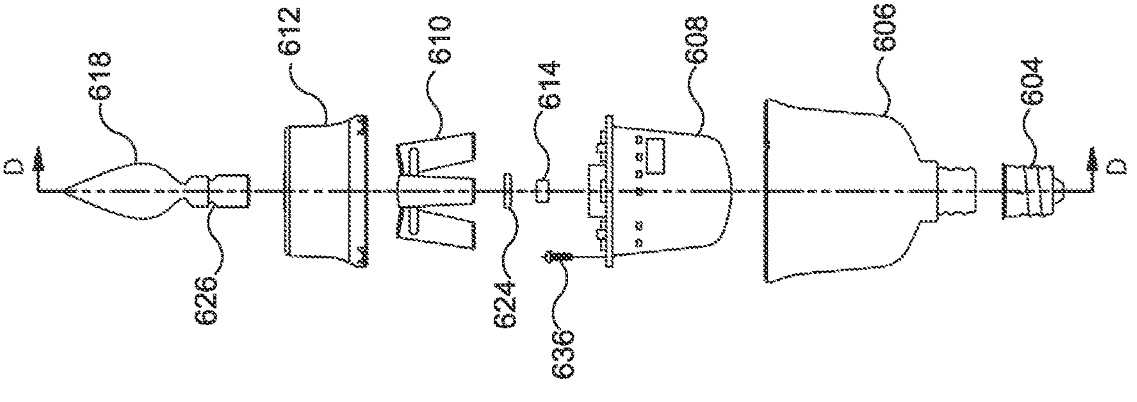
FIG. 6C depicts an exploded front view of the lighting device of FIG. 6B consistent with embodiments of the present disclosure.

FIG. 6C depicts an exploded front view of the lighting device 600 of FIG. 6B consistent with embodiments of the present disclosure. In various embodiments, bulb base 604 may be coupled to bottom casing 606 by screwing on or bulb base 604 may be coupled to bottom casing 606 by pressing fit. PCB assembly 608 may also be assembled to bottom casing 606 with a screw attachment 636. Light pipes 610 may direct light from PCB assembly 608 onto reflector 618. Top casing 612 may be coupled to bottom casing 606 by twisting secure. In some embodiments, top casing 612 may be coupled to bottom casing 606 using a snap fit or a friction fit.

Figure 6D:
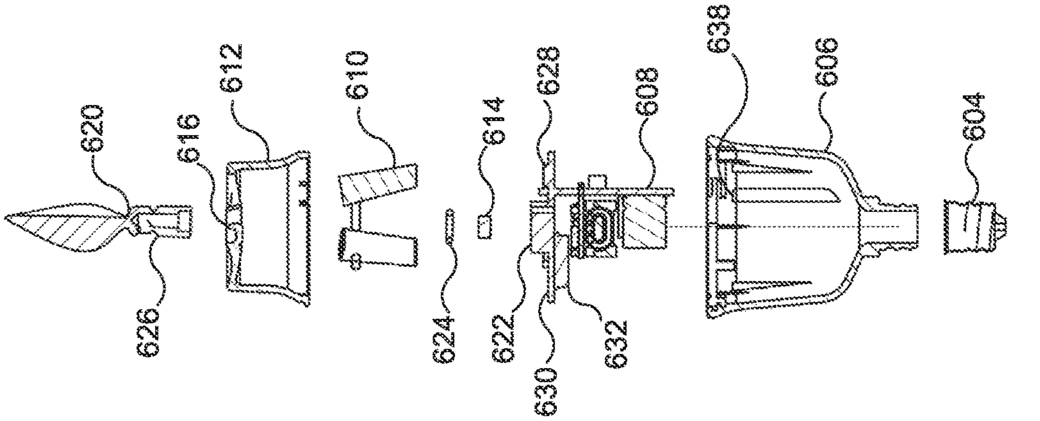
FIG. 6D depicts an exploded cross section view of the lighting device of FIG. 6E taken along line E-E consistent with embodiments of the present disclosure.

FIG. 6D depicts an exploded cross-section view of the lighting device of FIG. 6C taken along line D-D consistent with embodiments of the present disclosure. As illustrated, top casing 612 may receive light pipes 610. PCB assembly 608 may be received within bottom casing 606 with PCB alignment and assembly features that may be built into bottom casing 606. Top casing 612 may also receive reflector 618. Reflector pin 616 may include sufficient area to permit reflector 618 to move. Reflector 618 may receive magnet 614 and couple to magnet holder 634, which may be included at the base of reflector 618. Magnet 614 may be disposed above electromagnet 622.

Retaining O-ring 624 may be fastened to reflector 618 through O-ring groove 626 to hold reflector 618 in desired position within top casing 612. Reflector 618 may be assembled by sliding down over reflector pin 616 and attaching O-ring 624 from the bottom of reflector 618.

PCB assembly 608 may consist of a plurality of LEDs 628. Light generated by LEDs 628 may be directed toward reflector 618. LEDs 628 may be configurable to emit light of a desired color and brightness. PCB assembly 608 may also contain an LED driver 630 to regulate a desired amount of power to LEDs 628. LED driver 630 may receive power from a power supply contained in PCB assembly 608.

PCB assembly 608 may also contain an Internet of Things (I) module 632 that may enable wireless communication via WiFi, Bluetooth, or other wireless communication protocols. IOT module 632 may allow a user to control various aspects of the lighting device including PCB assembly 608, such as the color and/or brightness of LEDs 628, and/or motion of reflector 618. In some embodiments, a user may be able to control power, light intensity, motion, and color through an application in communication with IOT module 632.

Figure 6E:
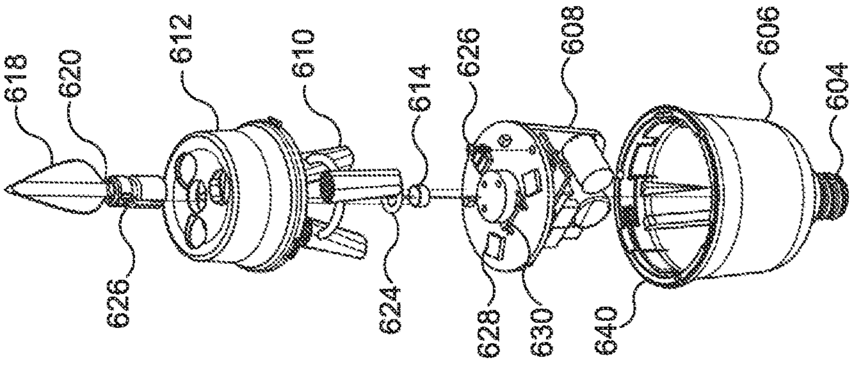
FIG. 6E depicts an exploded side view of the lighting device of FIG. 6A consistent with embodiments of the present disclosure.

FIG. 6E depicts an exploded perspective view of the lighting device 600 of FIG. 6A consistent with embodiments of the present disclosure. Bottom casing 606 may include a base twist lock element 640 to receive a corresponding cover twist lock element 642 disposed around a perimeter of the protective cover 602.

Figure 6F:
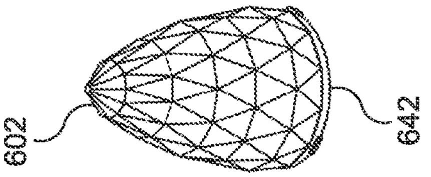
FIG. 6F depicts a perspective view of a bulb cover consistent with embodiments of the present disclosure.

FIG. 6F depicts a perspective view of a protective cover 602 consistent with embodiments of the present disclosure. Protective cover 602 may be formed of a transparent or translucent material that allows light to escape lighting device 600 of FIG. 6A while providing protection for the elements disposed within protective cover 602. Protective cover 602 may be coupled to bottom casing 606 by coupling twist lock element 640 and corresponding cover twist lock element 642 disposed on a base of protective cover 602. In various embodiments, protective cover 602 may be interchangeable by a user to allow customization. Protective cover 602 may be produced with a variety of decorative textures. Decorative textures may be smooth or made of a composition of different shapes.

Figure 6G:
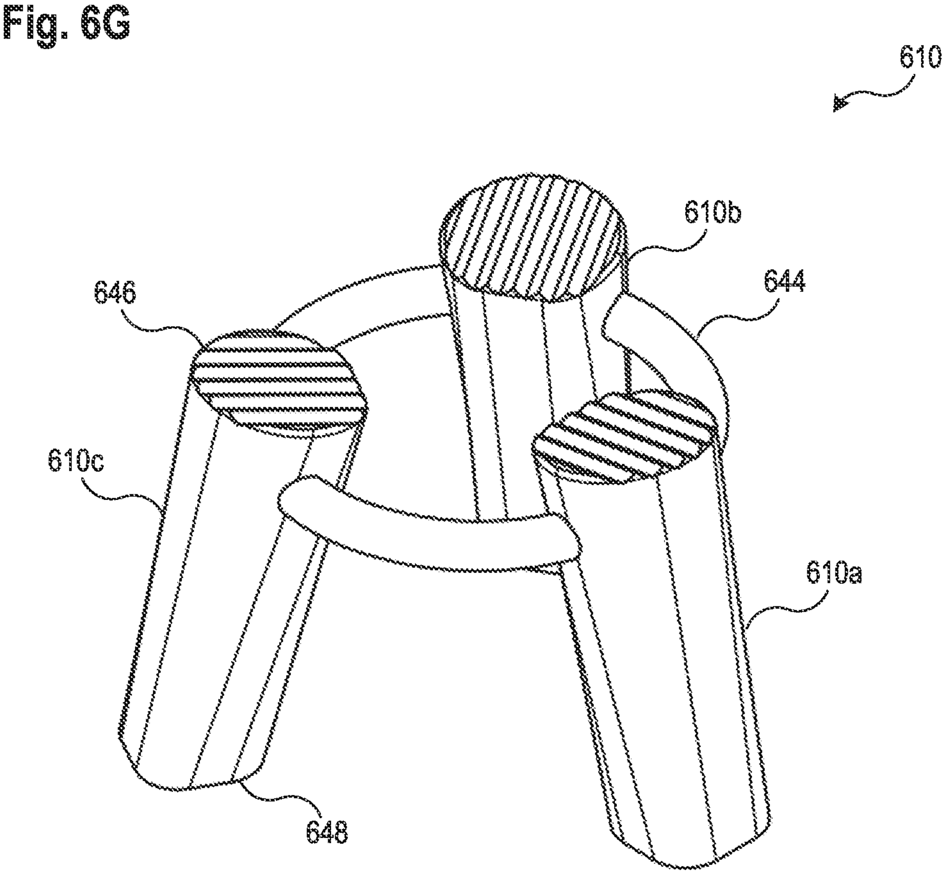
FIG. 6G illustrates an enlarged view of light pipes consistent with embodiments of the present disclosure.

FIG. 6G illustrates an enlarged view of light pipes 610 consistent with embodiments of the present disclosure. A torsion bar 644 may connect the three individual light pipes 610*a*, 610*b*, and 610*c*. In the illustrated embodiment, torsion bar 644 is configured in a circle. Torsion bar 644 may be configured to create a friction fit with top casing 612 in some embodiments.

Light pipes 610 may be configured to direct light from an LED 628 onto reflector 618. In some embodiments, an input 648 of light pipes 610 may match the shape of a corresponding LED 628. The shape of the light pipes 610 change from a rectangular cross section at an input 648 to a circular cross section at an output 646. In some embodiments, light pipes 610 may be tapered to increase light output efficiency. Output 646 may also comprise a textured, patterned or Fresnel lens exit surface. Such a surface may diffuse light exiting light pipes 610. Such diffusion may be particularly useful in conjunction with a multi-color light source, such as an RGBW LED. Light from an RGBW LED may include multiple elements corresponding to different colors, and as such, diffusing the light may improve the consistency at output 646.

Light pipes 610 may be configured primarily to direct light from LEDs 628 to reflector 618, and secondarily to direct light upward for ambient lighting. Light pipes 610 may further be configured to evenly distribute light across reflector 618, and to reduce off axis glare.

Figure 7A:
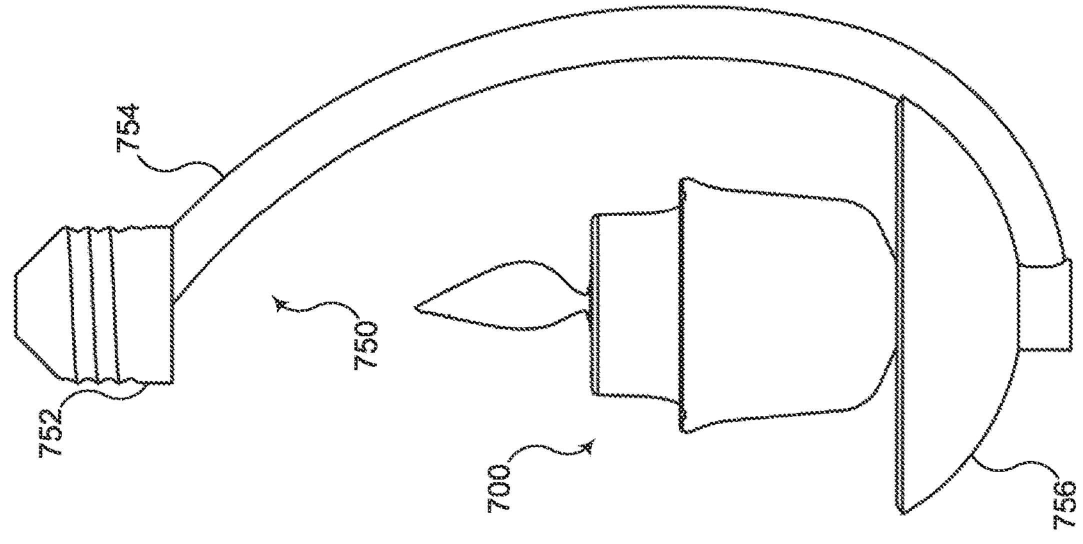
FIG. 7A depicts a side view of an adapter configured to couple to an electrical receptacle for a light bulb and to receive a lighting device consistent with embodiments of the present disclosure.

FIG. 7A depicts a side view of an adapter 750 configured to couple to an electrical receptacle (not shown) and to receive a lighting device 700 consistent with embodiments of the present disclosure. Adapter 750 may be configured to couple to a variety of receptacles. In the illustrated embodiment, adapter 750 includes an electrical connector 752 that is configured to couple to an E26 receptacle (not shown).

An arm 754 may extend between electrical connector 752 and an adapter base 756. Arm 754 may provide structural support to adapter base 756. As shown, adapter 750 is configured such that lighting device 700 is installed with a base (shown as 704 in FIG. 7C) pointed downward. As may be appreciated, if lighting device 700 were installed in the receptacle without adapter 750, lighting device 700, its base would point upward.

Figure 7B:
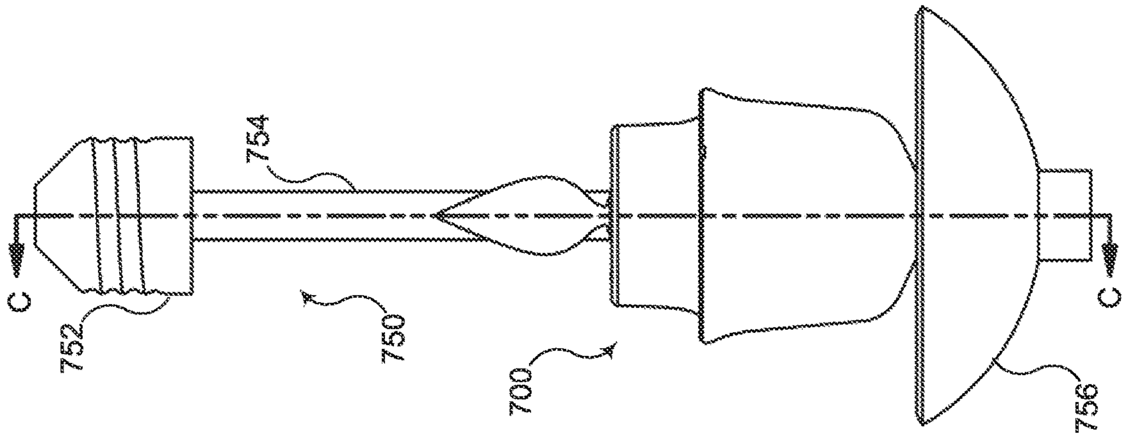
FIG. 7B depicts a front view of the adapter illustrated in FIG. 7A and consistent with embodiments of the present disclosure.

FIG. 7B depicts a front view of adapter 700 illustrated in FIG. 7A and consistent with embodiments of the present disclosure. In the illustrated embodiment, adapter 750 includes only one arm 754; however, in other embodiments, additional arms may connect electrical connector 752 to adapter base 756.

Figure 7C:
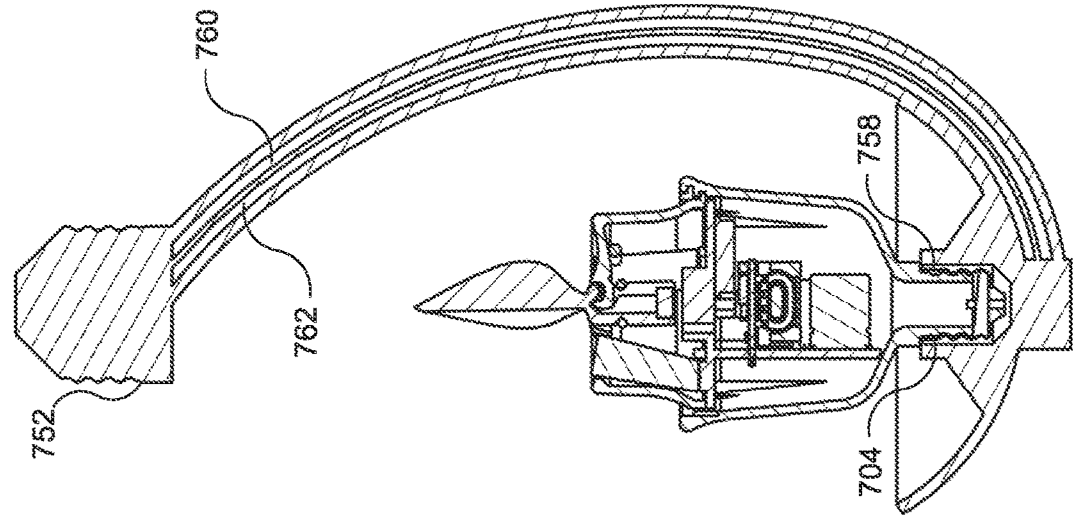
FIG. 7C depicts a cross-sectional view taken along line B-B in FIG. 7B and consistent with embodiments of the present disclosure.

FIG. 7C depicts a cross-sectional view taken along line B-B in FIG. 7B and consistent with embodiments of the present disclosure. Adapter base 756 may include an electrical receptacle 758 configured to receive lighting device 700. Arm 754 may include wires 760, 762 to conduct electrical energy from electrical connector 752 to electrical receptacle 758.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A light bulb, comprising:

a power subsystem configured to receive an alternating current input from a bulb base and to generate a direct current output;

a reflector;

a lighting subsystem configured to generate a light output using energy from the direct current output of the power subsystem and to direct the light output to the reflector;

a movement subsystem configured to move the reflector using energy from the direct current output of the power subsystem and to mimic an appearance of a flame;

a communication subsystem configured to receive at least one parameter associated with at least one of the lighting subsystem and the movement subsystem;

a control subsystem to implement the at least one parameter;

a transparent cover configured to enclose the reflector; and a bottom casing configured to enclose the power subsystem, the lighting subsystem, the movement subsystem, the communication subsystem, and the control subsystem.

2. The light bulb of claim 1, further comprising a light pipe disposed between a light element and the reflector, wherein the light pipe is configured to direct the light output onto the reflector.

3. The light bulb of claim 1, wherein the movement subsystem further comprises:

a magnet disposed in the reflector; and an electromagnet configured to be selectively activated and placed to attract the magnet disposed in the reflector;

wherein selective activation of the electromagnet is configured to attract the magnet disposed in the reflector and cause the reflector to move.

4. The light bulb of claim 3, wherein the reflector comprises a recess configured to receive a reflector pin and the recess and the reflector pin are configured to permit the reflector to pivot due to attraction between the electromagnet and the magnet disposed in the reflector.

5. The light bulb of claim 1, wherein the at least one parameter associated with the lighting subsystem comprises at least one of a color and an intensity.

6. The light bulb of claim 1, wherein the at least one parameter associated with the movement subsystem comprises a speed of movement.

7. The light bulb of claim 1, wherein the bottom casing further comprises a base twist lock element and the transparent cover further comprises a cover twist lock element, and wherein the base twist lock element and the cover twist lock element are configured to form a housing around the light bulb.

8. The light bulb of claim 1, further comprising a printed circuit board comprising:

a first portion of the printed circuit board configured to be received within the bottom casing; and a second portion of the printed circuit board configured to couple to the first portion and to be disposed in a substantially perpendicular orientation to the first portion.

9. The light bulb of claim 8, wherein the second portion of the printed circuit board comprises a plurality of light emitting diodes that are part of the lighting subsystem and an electromagnet that is part of the movement subsystem.

10. A lighting device, comprising:

a power subsystem configured to receive an alternating current input and to generate a direct current output;

a reflector;

a lighting subsystem configured to generate a light output using energy from the direct current output of the power subsystem and to direct the light output to the reflector;

a movement subsystem configured to move the reflector using energy from the direct current output of the power subsystem and to mimic an appearance of a flame;

a communication subsystem configured to receive at least one parameter associated with at least one of the lighting subsystem and the movement subsystem; and a control subsystem to implement the at least one parameter;

wherein the reflector comprises three sides offset by approximately 120 degrees.

11. A method of operating a light bulb, comprising:

receiving, using a power subsystem, an alternating current input from a bulb base and generating a direct current output;

providing a light bulb comprising:
a reflector,
a transparent cover configured to enclose the reflector, and
a bottom casing,
generating, using a lighting subsystem, a light output using energy from the direct current output of the power subsystem and directing the light output to the reflector;
moving, using a movement subsystem, the reflector to mimic an appearance of a flame;
receiving, using a communication subsystem, at least one parameter associated with at least one of the lighting subsystem and the movement subsystem; and
implementing, using a control subsystem, the at least one parameter;
wherein the bottom casing is configured to enclose the power subsystem, the lighting subsystem, the movement subsystem, the communication subsystem, and the control subsystem.

12. The method of claim 11, further comprising directing, using a light pipe disposed between a light element and the reflector, light output onto the reflector.

13. The method of claim 11, further comprising:
providing a magnet disposed in the reflector; and
selectively activating an electromagnet placed to attract the magnet disposed in the reflector;
wherein selectively activating the electromagnet attracts the magnet disposed in the reflector and causes the reflector to move.

14. The method of claim 13, further comprising:
providing a recess in the reflector configured to receive a reflector pin; and
wherein the recess and the reflector pin permit the reflector to pivot due to attraction between the electromagnet and the magnet disposed in the reflector.

15. The method of claim 11, wherein the at least one parameter associated with the lighting subsystem comprises at least one of a color and an intensity.

16. The method of claim 11, wherein the at least one parameter associated with the movement subsystem comprises a speed of movement.

17. The method of claim 11, wherein the bottom casing comprises a base twist lock element and the transparent cover comprises a cover twist lock element; and
further comprising forming a housing around the light bulb by coupling the base twist lock element and the cover twist lock element.

18. The method of claim 11, further comprising:
placing a first portion of a printed circuit board within the bottom casing; and
coupling a second portion of a printed circuit board to the first portion of the printed circuit board;
wherein the second portion of the printed circuit board is disposed in a substantially perpendicular orientation to the first portion of the printed circuit board.

* * * * *